Aug. 12, 1969   D. R. CAMPBELL   3,461,199
PROCESS FOR IMPROVING DIMENSIONAL STABILITY
OF TENSILIZED POLYESTER FILM
Filed May 3, 1966
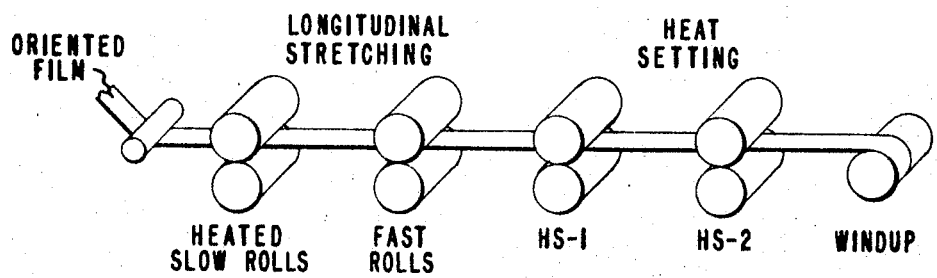
INVENTOR
DAVID ROBERT CAMPBELL
BY
ATTORNEY United States Patent Office 3,461,199
Patented Aug. 12, 1969

3,461,199
PROCESS FOR IMPROVING DIMENSIONAL STABILITY OF TENSILIZED POLYESTER FILM
David Robert Campbell, Florence, S.C., assignor to E. I. du Pont de Nemours and Company, Wilmington, Del., a corporation of Delaware
Filed May 3, 1966, Ser. No. 547,161
Int. Cl. B29c 25/00
U.S. Cl. 264—289                                    2 Claims

ABSTRACT OF THE DISCLOSURE

Asymmetrically biaxially oriented polyethylene terephthalate film is heat-set in two stages, the heat-setting temperature in the second stage being at least 5° C. below the heat-setting temperature of the first stage.

---

This invention relates to polyester film and more particularly to a process for improving the thermal dimensional stability of asymmetrically biaxially oriented (tensilized) polyethylene terephthalate film.

Tensilized polyester film as disclosed in United States Patent 3,165,499 has met with widespread acceptance, especially as a base for magnetic recording tape. It is characterized by having a very high tensile strength and a high tensile strength measured at 5% elongation, commonly known as the F-5 value (see United States Patent 3,165,499). A major deficiency of such tensilized film is its tendency to shrink at elevated temperatures. A high degree of orientation, that is a high stretch ratio, is employed to obtain high tensile properties, but this tends to increase the latent shrinkage energy. Crystallization of such films while holding under dimensional restraint (heat setting) decreases the shrinkage at elevated temperatures; this treatment, however, decreases tensile properties, notably the F-5 value, thus there is competition between the two desirable properties making it difficult to achieve the desired level of each.

The principal object of the present invention, therefore, is to provide a tensilized linear polyester film, e.g., polyethylene terephthalate film, of high thermal dimensional stability while maintaining a desirably high F-5 value. The foregoing and related objects will more clearly appear hereinafter.

These objects are realized by the present invention which briefly stated comprises in the process comprising asymmetrically biaxially stretching substantially amorphous linear polyester film, e.g. polyethylene terephthalate film, and thereafter heat setting at an elevated temperature; the improvement which comprises heat setting in two stages with the temperature in the first stage being within the range of from 150° C. to 250° C., and the temperature in the second stage being at least 5° below the temperature in the first stage, but above the second order transition temperature for said polyester film.

The process of my invention is illustrated diagrammatically in the accompanying drawing.

The expression "second order transition temperature" is defined as the temperature at which a discontinuity occurs in the curve of a first derivative thermodynamic quantity with temperature. It is correlated with yield temperature and polymer fluidity and can be observed from a plot of density, specific volume, specific heat, sonic modulus or index of refraction against temperature.

In its preferred form the present invention is adapted to the process of stretching according to Winter, United States Patent 2,995,779, which in its general terms involves heating a substantially amorphous film to a temperature of 80° to 90° C., stretching the film at 80° to 90° C. at least 3.3 times its initial width, and heating the film to a temperature of 90° to 160° C., and stretching at a temperature of 90° to 160° C. to 3.0 to 6.0 times its initial length. Such film is normally heat set by passing between a pair of heated rolls at a temperature above the second direction stretch and between 135° and 250° C. According to the present invention heat setting is by a two-stage process, where the first stage is according to the process of United States Patent 2,995,779, employing a pair of heat setting rolls immediately following the fast rolls of the stretching stage with the second stage at a temperature lower than the first by at least 5° C. but preferably by 10° C., employing an added or second pair of heat setting rolls. The particular utility of the present invention is in enabling the production of a tensilized film having a high tensile strength at 5% elongation without substantially sacrificing thermal dimensional stability.

The minimum temperature difference between the first and second heat set of two stage heat setting of the present invention is 5° C., with at least 10° C. being preferred. The operable maximum temperature difference is a function of the maximum operable temperature of the first heat set and the minimum operable temperature of the second heat set. The first stage heat set is accomplished in the range of 150° C. and 250° C., the maximum temperature being approximately 5° to 10° below the melting point for polyethylene terephthalate film and for copolyesters of ethylene terephthalate, containing isophthalic or other dibasic acids. The temperature of the last stage of heat setting is accomplished at a temperature above the second order transition temperature. This temperature varies with the molecular weight of a polymer, and with the nature of the polyester, i.e. polyethylene terephthalate or its copolyesters; for polyethylene terephthalate the minimum temperature has been found to be about 80° C. Temperatures below 80° C. result in poor quality film from the standpoint of wrinkles, especially where it is desired to impart a small degree of relaxation in the latter stage.

The following examples will serve to further illustrate the principles and practice of this invention.

EXAMPLE 1

Forty separate samples of tensilized polyethylene terephthalate film of a nominal thickness of 0.001 inch were produced by the method of Winter, United States Patent 2,995,779, except that the heat setting step was accomplished in two stages. Of these 40 samples, 24 were heat set in the "up-stage" sequence in which the first pair of heat set rolls were at a lower temperature than the second pair. Sixteen were heat set by the "down-stage" process in which the first pair of heat set rolls were at a higher temperature than the second pair. Table I indicates the temperatures employed, the fast roll indicated is the second pair of nip rolls which draw the film in the second direction according to the cited patent. HS-1 is the first pair of heat setting rolls through which the film passes, HS-2 is the second pair of heat setting rolls in this two-stage heat setting process. TDX is the stretch ratio (number of times its original dimension stretched) in the transverse (at right angles to the direction of extrusion) direction, MDX is the stretch ratio in the longitudinal, or machine, direction, that is, the direction of extrusion. Average values of dimensional stability and F-5 are given.

TABLE I

|  | Heat setting profile | |
|---|---|---|
|  | Upstage | Downstage |
| TDX | 3.4 | 3.4 |
| MDX | 4.67 | 4.67 |
| Fast roll temp., °C | 151 | 152 |
| HS-1 roll temp., °C | 155 | 180 |
| HS-2 roll temp., °C | 190 | 150 |
| Dim. Stab. (MD), 105° C | 2.65 | 1.77 |
| Dim. Stab. (TD), 105° C | 1.22 | 1.06 |
| $F_5$, p.s.i | 23,400 | 22,200 |

A sample of film produced according to Winter, United States Patent 2,995,779, had an MD dimensional stability of 3.1% and an F-5 of 20,000 p.s.i.

EXAMPLE 2

A number of rolls of tensilized polyethylene terephthalate "up-stage" were heat set as in Example 1, with samples made and compared among the various gauges of tensilized film. The fast roll temperature was 150° C., the first heat set roll was at 150° C., and the second heat set roll was at 200° C. in the "up-stage" process. In the "down-stage" process, the fast roll was at 150° C., the first heat-roll was at 195° C., and the second heat-set roll was at 175° C. The average percent shrinkage and F-5 values are set forth in the following table:

TABLE II

| Finished film guage, inches | Heat setting (number of samples) | 105° C. Dim. Stab. percent shrinkage | F-5 (p.s.i.) |
|---|---|---|---|
| 0.0005 | Upstage (149) | 3.14 | 23,500 |
|  | Downstage (104) | 1.79 | 22,200 |
| 0.001 | Upstage (134) | 3.10 | 25,300 |
|  | Downstage (233) | 1.93 | 22,400 |
| 0.0015 | Upstage (62) | 2.96 | 25,400 |
|  | Downstage (38) | 1.69 | 22,900 |

EXAMPLE 3

A number of runs were made as in Example 2, but with controlled longitudinal relaxation during heat setting. The results are summarized in Table III.

TABLE III

| Heat setting pattern | Total relaxation, percent | HS-1, °C. | HS-2, °C. | 105° C. Dim. stab. | F-5 (p.s.i.) |
|---|---|---|---|---|---|
| Upstage | −3 | 155 | 180 | 2.96 | 24,200 |
| Do | −3 | 170 | 180 | 2.53 | 22,300 |
| Equal | −3 | 180 | 180 | 1.94 | 21,400 |
| Downstage | −3 | 190 | 184 | 1.77 | 20,400 |
| Do | −3 | 190 | 170 | 1.70 | 20,600 |
| Do | −3 | 185 | 150 | 1.06 | 20,600 |

EXAMPLE 4

Separate rolls of tensilized film as in Example 2 were made with a lower range of temperature for the final heat set roll. Conditions were as follows:

Slow roll temperature: 134° C. (Note 1).
Fast roll temperature: 140° C. (Note 2).
First heat set roll: 195° C. (Note 3).
Second heat set roll: As indicated in Table IV.
Quench rolls temperature: 27° C.
MD stretch ratio: 4.65 (Note 4).
Relaxation pattern: 0, 0, 1.1 (Note 5).
Film speed: 63 yards per minute.

Notes:
(1) This is the effective stretching temperature.
(2) This pair of rolls effects some heat setting action, although the primary function is to advance the film at a speed several times that of the slow rolls (this determines the stretch ratio).
(3) The film at this speed (63 yards/minute) and for operable ranges of thickness (5 mils or less) is found to attain a temperature within 1° C. of the temperature of the heated rolls; under the most adverse conditions it is not more than 2° to 5° below the temperature of the roll. The significant feature is the difference in temperatures of successive rolls; the profile of temperatures attained by the film parallels the profile of roll temperatures.
(4) This is determined by the ratio of the speed of the film entering slow rolls to the speed of the film emerging from the fast rolls.
(5) The relaxation pattern 0, 0, 1.1 indicates zero relaxation between the fast rolls and first heat set, zero between the first heat set and second heat set, and 1.1% between the second heat set and quench.

TABLE IV

| Roll number | Second heat set, °C. | F-5 (p.s.i.) | Percentage shrinkage at 105° C. | |
|---|---|---|---|---|
|  |  |  | MD | TD |
| 1 | 140 | 24,000 | 1.33 | 0.66 |
| 2 | 140 | 23,200 | 1.39 | 0.81 |
| 3 | 130 | 22,900 | 1.32 | 0.75 |
| 4 | 130 | 23,300 | 1.48 | 1.06 |
| 5 | 120 | 23,200 | 1.37 | 1.17 |
| 6 | 120 | 23,000 | 1.56 | 1.01 |
| 7 | 110 | 24,700 | 1.58 | 0.91 |
| 8 | 110 | 23,700 | 1.78 | 1.06 |
| 9 | 100 | 25,300 | 1.74 | 1.06 |
| 10 | 100 | 24,200 | 1.80 | 1.12 |

EXAMPLE 5

A series of rolls of film similar to those of Example 4 was produced to extend the test below 100° C. Conditions were the same except that the stretch ratio was slightly lower, 2.57 in this example compared to 2.65 in Example 4; this slightly lower stretch ratio results in lower tensile properties and also reduces shrinkage at elevated temperatures.

| Roll number | Second heat set, °C. | F-5 (p.s.i.) | Percentage shrinkage at 105° C. | |
|---|---|---|---|---|
|  |  |  | MD | TD |
| 1 | 140 | 23,100 | 1.16 | 0.75 |
| 2 | 140 | 23,700 | 1.18 | 0.67 |
| 3 | 80 | 24,100 | 1.70 | 1.12 |
| 4 | 80 | 24,200 | 1.53 | 1.05 |

The present invention is exemplified herein as adapted to polyethylene terephthalate film, however, it is found adaptable to linear copolyesters of ethylene terephthalate and other dibasic organic acids, such as isophthalic.

What is claimed is:
1. In the process comprising asymmetrically biaxially orienting substantially amorphous film of a polyethylene terephthalate and thereafter heat setting at an elevated temperature; the improvement which comprises heat setting in two stages with the temperature in the first stage being within the range of from 150° to 250° C., and the temperature in the second stage being at least 5° below the temperature in the first stage, but above the second order transition temperature for said film.
2. The process of claim 1 wherein the temperature in the second stage is at least 10° C. below the temperature in the first stage.

References Cited

UNITED STATES PATENTS 3,061,886  11/1962  Seager et al. _____ 264—346
3,165,499  1/1965  Alles _____ 264—289 XR (Other references on following page)

UNITED STATES PATENTS

| | | | |
|---|---|---|---|
| 2,779,684 | 1/1957 | Alles | 264—289 XR |
| 2,995,779 | 8/1961 | Winter | 264—210 |
| 3,330,897 | 7/1967 | Tessier. | |

FOREIGN PATENTS

| | | |
|---|---|---|
| 235,432 | 9/1961 | Australia. |
| 237,060 | 1/1962 | Australia. |
| 851,875 | 10/1960 | Great Britain. |
| 857,896 | 1/1961 | Great Britain. |

PHILIP E. ANDERSON, Primary Examiner

U.S. Cl. X.R.

264—346, 342